US012798353B2

(12) United States Patent
Kouketsu

(10) Patent No.: US 12,798,353 B2
(45) Date of Patent: Nov. 17, 2026

(54) VIBRATION DAMPING DEVICE

(71) Applicant: Sumitomo Riko Company Limited, Aichi (JP)

(72) Inventor: Taiki Kouketsu, Aichi (JP)

(73) Assignee: Sumitomo Riko Company Limited, Aichi (JP)

(*) Notice: Subject to any disclaimer, the term of this patent is extended or adjusted under 35 U.S.C. 154(b) by 389 days.

(21) Appl. No.: 18/500,126

(22) Filed: Nov. 2, 2023

(65) Prior Publication Data

US 2024/0198780 A1 Jun. 20, 2024

(30) Foreign Application Priority Data

Dec. 20, 2022 (JP) ................................ 2022-203273

(51) Int. Cl.
*B60K 5/12* (2006.01)

(52) U.S. Cl.
CPC ................................ *B60K 5/1208* (2013.01)

(58) Field of Classification Search
CPC ...... B60K 5/12; B60K 5/1208; B60K 5/1291; F16F 13/10; F16M 7/00
See application file for complete search history.

(56) References Cited

U.S. PATENT DOCUMENTS 7,207,552 B2 4/2007 Bregeault
9,739,333 B2 * 8/2017 Michiyama .......... B60K 5/1208
10,203,012 B2 2/2019 Scharf et al.
10,415,665 B2 * 9/2019 Goto .................... B60K 5/1208
2014/0084526 A1 3/2014 Watanabe
2019/0143800 A1 5/2019 Takakura
(Continued)

FOREIGN PATENT DOCUMENTS

CN 1735760 2/2006
CN 102562892 12/2014
CN 205371443 U * 7/2016
(Continued)

OTHER PUBLICATIONS

"Notice of Reasons for Refusal of Japan Counterpart Application", issued on Jul. 1, 2026, with English translation thereof, p. 1-p. 5.
(Continued)

*Primary Examiner* — Vishal R Sahni
(74) *Attorney, Agent, or Firm* — JCIPRNET

(57) ABSTRACT

A vibration damping device has a configuration in which a first mounting member and a second mounting member are elastically linked by a main rubber elastic body. The first mounting member has a tubular part open on a side and extending. A side stopper rubber is provided, the side stopper rubber protruding from an outer circumferential surface of the tubular part toward an outer circumference toward a side orthogonal to a central axis A of the tubular part. The side stopper rubber is arranged in a tapered shape toward a protrusion tip end. A concave groove extending in a circumferential direction of the side stopper rubber is formed in an intermediate portion excluding a base end and a tip end of the side stopper rubber in a protrusion direction. A buffer protrusion protruding from a protrusion tip end surface of the side stopper rubber is provided.

7 Claims, 6 Drawing Sheets

(56) References Cited

U.S. PATENT DOCUMENTS

2019/0316645 A1 10/2019 Kawahara et al.

FOREIGN PATENT DOCUMENTS

| | | |
|---|---|---|
| CN | 110356214 | 10/2019 |
| CN | 113217575 | 8/2021 |
| JP | 2006505751 | 2/2006 |
| JP | 2014066334 | 4/2014 |
| JP | 2018031410 | 3/2018 |
| JP | 2019182240 | 10/2019 |
| WO | 2017213049 | 12/2017 |

OTHER PUBLICATIONS

"First Office Action of China Counterpart Application", issued on Aug. 8, 2026, with English translation thereof, p. 1-p. 15.

* cited by examiner

VIBRATION DAMPING DEVICE

CROSS-REFERENCE TO RELATED APPLICATION

This application claims the priority benefit of Japan application serial No. 2022-203273, filed on Dec. 20, 2022. The entirety of the above-mentioned patent application is hereby incorporated by reference herein and made a part of this specification.

BACKGROUND

Technical Field

The disclosure relates to a vibration damping device suitable for an engine mount of an automobile, etc., for example.

Description of Related Art

Conventionally, a vibration damping device suitable for an engine mount, etc., which links an engine to a vehicle body in an automobile for vibration damping is known. For example, Japanese Laid-open No. 2006-505751 (Patent Document 1) discloses a configuration in which a first mounting member and a second mounting member are elastically linked by a main rubber elastic body. In the case where the vibration damping device is used as an engine mount, for example, the first mounting member is mounted to the engine side, and the second mounting member is mounted to the vehicle body side. Accordingly, the vibration damping device links the engine and the vehicle body to each other for vibration damping.

In addition, a stopper mechanism which limits the relative side displacement amount between the first mounting member and the second mounting member is disclosed in the vibration damping device of Patent Document 1. By making the first mounting member and the second mounting member side (a bracket mounted to the second mounting member) contact each other via a side stopper rubber protruding from a tubular part of the first mounting member toward the outer circumferential side, the stopper mechanism limits the relative displacement amount between the first mounting member and the second mounting member in the protrusion direction of the side stopper rubber.

PRIOR ART DOCUMENT(S)

Patent Document(s)

[Patent Document 1] Japanese Laid-open No. 2006-505751

The side stopper rubber is required to exhibit a hard spring property which can exert sufficient displacement limiting performance in the case where the relative displacement amount between the first mounting member and the second mounting member is large due to rapid acceleration/deceleration, etc. Meanwhile, in the case of contacting the second mounting member side with a small compression deformation amount during slow acceleration, etc., in which strong displacement limiting performance is not required, from the perspective of avoiding an adverse effect to ride comfort, etc., a soft spring property is favored.

However, in the side stopper rubber shown in Patent Document 1, even at the time of a contact with a small compression deformation amount, a relatively hard spring property is exerted. Therefore, an adverse effect to ride comfort has become a concern.

SUMMARY

An aspect of the disclosure provides a vibration damping device having a configuration in which a first mounting member and a second mounting member are elastically linked by a main rubber elastic body. The first mounting member has a tubular part open and extending on a side. A side stopper rubber is provided, the side stopper rubber protruding from an outer circumferential surface of the tubular part toward an outer circumference toward a side orthogonal to an axial direction of the tubular part. The side stopper rubber is arranged in a tapered shape toward a protrusion tip end. A concave groove extending in a circumferential direction of the side stopper rubber is formed in an intermediate portion excluding a base end and a tip end of the side stopper rubber in a protrusion direction. A buffer protrusion protruding from a protrusion tip end surface of the side stopper rubber is provided.

DESCRIPTION OF THE EMBODIMENTS

Figure 1:
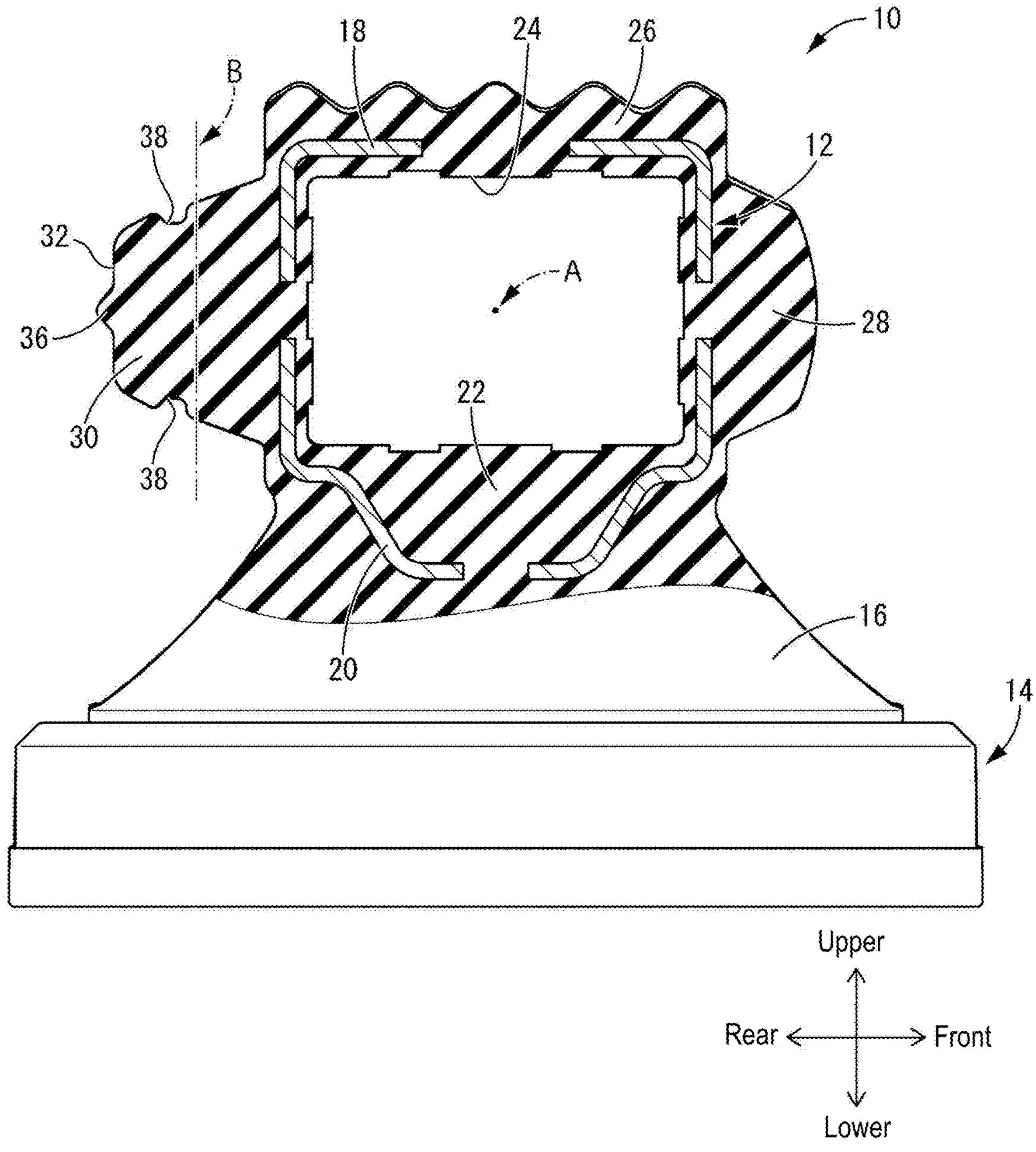
FIG. 1 is a partial cross-sectional view illustrating an engine mount as a first embodiment of the disclosure, and is equivalent to a cross-section I-I of FIG. 3.
Figure 2:
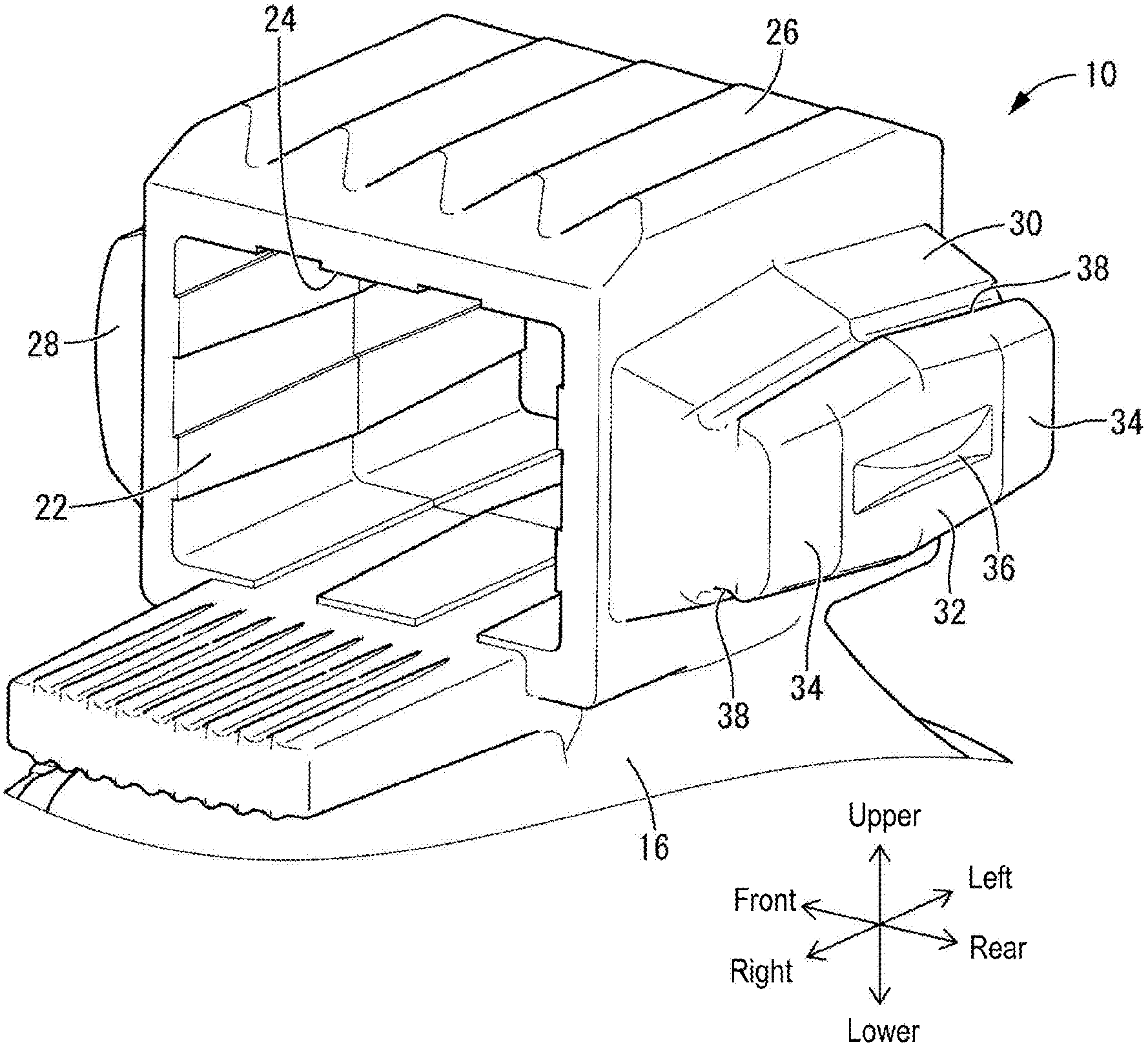
FIG. 2 is a perspective view illustrating the main components of the engine mount shown in FIG. 1.

The disclosure provides a vibration damping device with a novel structure, in which a soft spring property in a state in which the compression deformation amount of the side stopper rubber is small as well as a hard spring property in a state in which the compression deformation amount of the side stopper rubber is large can both be realized.

Exemplary embodiments for understanding the disclosure are described below. Each of the aspects described below is described as an example. Not only can they be employed in combination with each other as appropriate, but also the components described in each aspect can be recognized and employed independently as much as possible. The components can also be employed in combination with any of the components described in other aspects as appropriate. Accordingly, the disclosure can be implemented in various alternatives without being limited to the embodiments described below.

A first aspect provides a vibration damping device. The vibration damping device has a configuration in which a first mounting member and a second mounting member are elastically linked by a main rubber elastic body. The first mounting member has a tubular part open and extending on a side. A side stopper rubber is provided. The side stopper rubber protrudes from an outer circumferential surface of the tubular part toward an outer circumference toward a side orthogonal to an axial direction of the tubular part. The side stopper rubber is arranged in a tapered shape toward a protrusion tip end. A concave groove extending in a circumferential direction of the side stopper rubber is formed in an intermediate portion excluding a base end and a tip end of the side stopper rubber in a protrusion direction. A buffer protrusion protruding from a protrusion tip end surface of the side stopper rubber is provided.

According to the vibration damping device configured according to the aspect, the cross-sectional area in the orthogonal direction with respect to the protrusion direction of the side stopper rubber in the portion where the concave groove is formed is reduced. Therefore, a soft spring property can be set in the protrusion direction with respect to the side stopper rubber. In particular, in the side stopper rubber in a tapered shape, by locating the concave groove at the intermediate portion in the side stopper rubber in the protrusion direction, a reduction effect to the compression spring of the side stopper rubber due to the formation of the concave groove is effectively exerted in the state in which the compression deformation amount in the protrusion direction of the side stopper rubber is small.

In addition, by providing the buffer protrusion on the protrusion tip end surface of the side stopper rubber, the contact area of the side stopper rubber to the second mounting member side at the initial stage of contact is reduced, and the impact at the time of contact is reduced. In the state in which the compression deformation amount in the protrusion direction of the buffer protrusion increases, since the protrusion tip end surface of the side stopper rubber contacts the second mounting member side, a sudden increase of the spring due to the contact of the protrusion tip end surface of the side stopper rubber to the second mounting member side can be avoided. In addition, at the time of contact of the buffer protrusion, a contact force is also applied to the side stopper rubber via the buffer protrusion, so the compression spring of the side stopper rubber itself, which serves as the base of the buffer protrusion, is also reduced by the concave groove. Therefore, it is possible to attain an excellent effect of reducing contact impact while ensuring the volume of the buffer protrusion.

According to a second aspect, in the vibration damping device of the first aspect, the concave groove is formed on a tip end side with respect to a center of the side stopper rubber in the protrusion direction, but not formed on a base end side with respect to the center of the side stopper rubber in the protrusion direction, the side stopper rubber is arranged in a flat shape in which a length dimension in the axial direction of the tubular part is greater than a width dimension orthogonal to the axial direction of the tubular part, the buffer protrusion is partially provided at a center of the protrusion tip end surface of the side stopper rubber, the buffer protrusion is arranged in a flat shape in which a length dimension in the axial direction of the tubular part is greater than a width dimension orthogonal to the axial direction of the tubular part, and the buffer protrusion is arranged in a tapered shape in which a protrusion height dimension is reduced from a center in a length direction toward both outer sides.

According to the vibration damping device configured according to the aspect, by arranging the position where the concave groove is formed on the tip end side with respect to the center in the protrusion direction in the tapered side stopper rubber, even in the state in which the compression deformation amount in the protrusion direction of the side stopper rubber is small, a compression spring reduction effect due to formation of the concave groove can be exerted effectively.

When the compression deformation amount in the protrusion direction in the side stopper rubber increases, hard compression spring is exerted by the base end portion of the side stopper rubber in which the concave groove is not formed. Therefore, when a large load is input, the displacement limiting performance by the side stopper rubber is exerted effectively.

The side stopper rubber is elongated in the axial direction of the tubular part, and the buffer protrusion is located at the central portion on the protrusion tip end surface of the side stopper rubber. Therefore, as the compression deformation amount in the protrusion direction of the side stopper rubber increases, the contact area gradually expands from the central portion where the buffer protrusion is provided toward the outer sides in the axial direction of the tubular part. In this way, the protrusion end surface does not entirely contact the second mounting member side at the same time, but contacts to gradually expand the contact area from the central side in the axial direction toward the outer sides as the compression deformation amount of the side stopper rubber increases. Therefore, a sudden change of the contact area is prevented, and a sudden spring increase is avoided.

According to a third aspect, in the vibration damping device of the first or second aspect, a pair of concave grooves are formed on both side surfaces of the side stopper rubber in a width direction.

According to the vibration damping device configured according to the aspect, with the concave grooves being open on the both side surfaces of the side stopper rubber in the width direction and extending in the longitudinal direction of the side stopper rubber, the cross-sectional area of the orthogonal cross-section with respect to the protrusion direction of the side stopper rubber is efficiently reduced in the portions where the concave grooves are formed. Therefore, the portions where the concave grooves are formed in the side stopper rubber are preferentially deformed. Thus, a soft compression spring property can be attained. In particular, by forming the concave grooves on the both sides of the side stopper rubber, even if the depths of the concave grooves are relatively small, the cross-sectional area of the side stopper rubber in the portions where the concave grooves are formed can be set small.

Depending on the direction (load input direction) of the relative displacement between the first mounting member and the second mounting member, a softer spring property at the initial stage of contact can be exerted through swing-like deformation of the side stopper rubber at the portions where the concave grooves are formed.

According to a fourth aspect, in the vibration damping device of the second or third aspect, the concave grooves extend linearly to be substantially parallel to the axial direction of the tubular part on both side surfaces of the side stopper rubber in a width direction, and a protrusion height dimension on the tip end side with respect to the concave groove in the side stopper rubber is reduced toward both outer sides at both end portions in the axial direction of the tubular part.

According to the vibration damping device configured according to the aspect, The entire protrusion tip end surface of the side stopper rubber does not entirely contact the component on the second mounting member side at the same time in the axial direction of the tubular part, but the contact region expands in a stepped manner or gradually from the central portion toward the both outer sides. Therefore, a soft spring property at the initial stage of contact is more advantageously realized, and a shock feeling, etc., due to a sudden increase of the spring is reduced.

According to a fifth aspect, in the vibration damping device of the second or third aspect, the buffer protrusion is arranged in a tapered shape in which a protrusion height dimension is reduced from a center in a width direction toward both outer sides.

According to the vibration damping device configured according to the aspect, since the buffer protrusion is also arranged in a tapered shaped in the circumferential direction, in addition to the axial direction of the tubular part, when the side stopper rubber including the buffer protrusion contacts the second mounting member side, a buffer effect due to the buffer protrusion can be effectively attained.

According to a sixth aspect, in the vibration damping device of the second or third aspect, a width of the side stopper rubber is reduced from the center in the length direction toward the both outer sides.

According to the vibration damping device configured according to the aspect, when the contact region of the side stopper rubber with respect to the second mounting member side expands from the central portion where the buffer protrusion is provided toward the both outer sides in the axial direction of the tubular part, a sudden increase of the contact area of the side stopper rubber is suppressed. Therefore, a sudden increase of the compression spring of the side stopper rubber is prevented.

According to a seventh aspect, in the vibration damping device of any one of the first to sixth aspects, in a vehicle mounted state in which the first mounting member and the second mounting member are mounted to a vehicle, a front stopper rubber protruding toward a front of the vehicle and a rear stopper rubber protruding toward a rear of the vehicle are provided, the rear stopper rubber is arranged as the side stopper rubber, and the front stopper rubber has a protrusion height dimension smaller than the rear stopper rubber, and is not formed with neither the concave groove of the outer circumferential surface nor the buffer protrusion of the protrusion tip end surface.

According to the vibration damping device configured according to the aspect, the front stopper rubber and the rear stopper rubber differ in whether the concave groove and the buffer protrusion are provided and the height dimension, and are set with spring properties different from each other. The spring property of the rear stopper buffer is set to be softer than the spring property of the front stopper rubber in the state in which the compression deformation amount in the protrusion direction is small. In addition, in the vehicle mounted state of the vibration damping device, the front stopper rubber is located at the front of the vehicle. Accordingly, for example, during slow acceleration of the vehicle, etc., in which the rear stopper rubber contacts the second mounting member side with a small compression deformation amount, due to the softer spring property of the rear stopper rubber, favorable ride comfort, etc., is realized. Meanwhile, during deceleration of the vehicle, etc., in which the front stopper rubber contacts the second mounting member side, due to the harder spring property of the front stopper rubber, favorable steering stability at the time of braking, etc., is realized.

According to the disclosure, a soft spring property in a state in which the compression deformation amount in the protrusion direction of the side stopper rubber is small, as well as a hard spring property in a state in which the compression deformation amount in the protrusion direction of the side stopper rubber is large, can both be realized. In addition, it is easy to set a larger non-linear spring property by increasing the difference between a soft spring property at an initial stage when the contact force is small and a hard spring property after the contact force has increased sufficiently.

In the following, the embodiments of the disclosure will be described with reference to the drawings.

Figure 4:
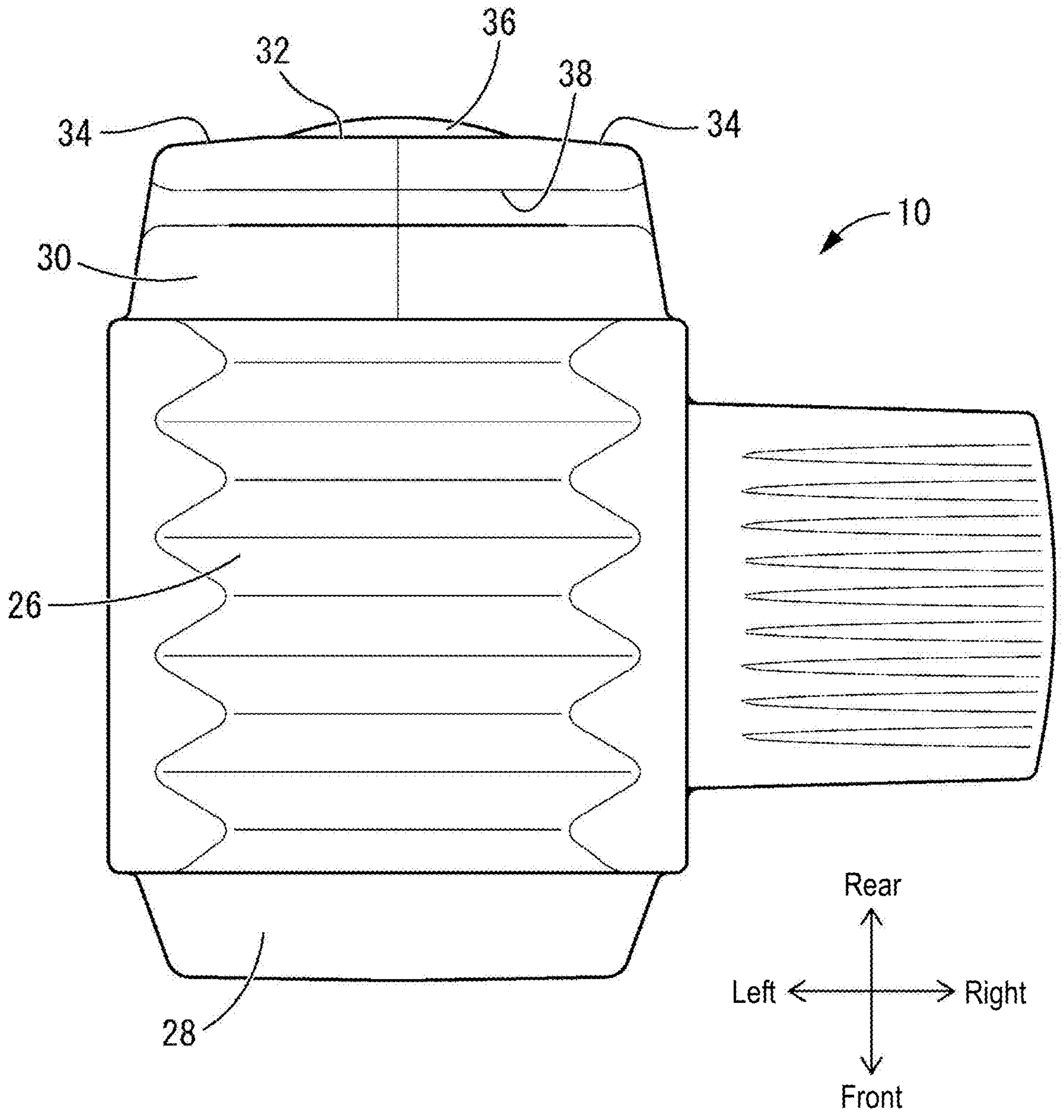
FIG. 4 is a plan view of the main components of the engine mount shown in FIG. 2.
Figure 5:
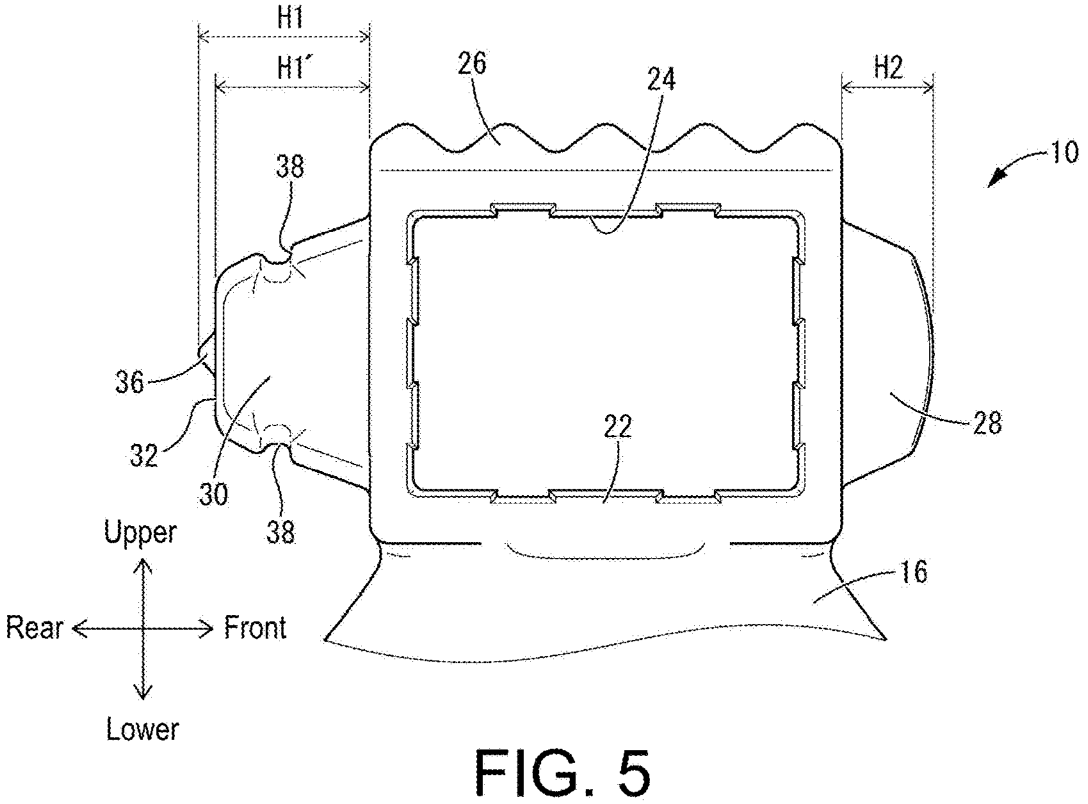
FIG. 5 is a left side view of the main components of the engine mount shown in FIG. 2.

In FIGS. 1 and 5, as a first embodiment of a vibration damping device configured according to the disclosure, an engine mount 10 of an automobile is shown. As shown in FIG. 1, the engine mount 10 has a configuration in which a first mounting member 12 and a second mounting member 14 are linked by a main rubber elastic body 16. In the following description, in general, the upper-lower direction refers to the upper-lower direction in FIG. 1, which is a width direction of a rear stopper rubber 30 and a buffer protrusion 36 to be described afterwards, the front-rear direction refers to the upper-lower direction in FIG. 4, which is a vehicle front-rear direction, and the left-right direction refers to the left-right direction in FIG. 4, which is the length direction of the rear stopper rubber 30 and the buffer protrusion 36 to be described afterwards.

The first mounting member 12 is a rigid component formed by metal, etc., and includes a tubular part 18 provided for installation and arranged in a substantially rectangular tubular shape extending in the left-right direction, and a fixing part 20 protruding downward at a lower side portion of the tubular part 18. A central axis A of the tubular part 18 extends in a direction orthogonal to the paper surface of FIG. 1.

The second mounting member 14 is a rigid component formed by a metal, etc., like the first mounting member 12, and is separately disposed below the first mounting member 12. The shape of the second mounting member 14 is not particularly limited, and may be, for example, in an annular (tubular) shape or a plate shape.

The main rubber elastic body 16 is provided between the first mounting member 12 and the second mounting member 14. The main rubber elastic body 16 is arranged in a substantially truncated cone shape. The first mounting member 12 is fixed to the upper end part of the main rubber elastic body 16, which is an end part on a small diameter side, and the second mounting member 14 is fixed to the lower end part of the main rubber elastic body 16, which is an end part on a large diameter side.

A fitting rubber 22 is fixed to the inner circumferential surface of the first mounting member 12. The fitting rubber 22 is integrally formed with the main rubber elastic body 16, filled into the fixing part 20 arranged in a reversed hollow truncated cone shape, and formed to be adhered to the inner circumferential surface of the tubular part 18 in a layer-like manner. On the inner circumference of the tubular part 18, by using the fitting rubber 22, a bracket mounting hole 24 penetrating through in the left-right direction and having a square hole cross-sectional shape is provided.

An upper stopper rubber 26 is fixed to the outer circumferential surface of the tubular part 18 in the first mounting member 12. The upper stopper rubber 26 is fixed to the upper surface of an upper side portion of the tubular part 18, and protrudes upward from the tubular part 18. The upper stopper rubber 26 is integrally formed with the main rubber elastic body 16. The upper surface of the upper stopper rubber 26 is arranged to be wavy with unevenness repeating in the front-rear direction, and the upper stopper rubber 26 exhibits a buffer performance at the time of contacting an outer bracket 40 to be described afterwards.

A front stopper rubber 28 is fixed to the outer circumferential surface of the tubular part 18 in the first mounting member 12. The front stopper rubber 28 is fixed to the front surface of a front side portion of the tubular part 18, and protrudes forward from the tubular part 18. The front stopper rubber 28 is integrally formed with the main rubber elastic body 16. As shown in FIGS. 1 and 5, the front stopper rubber 28 has a width in the upper-lower direction gradually reduced toward the protrusion tip end side (front), and, as shown in FIG. 4, also has a width in the left-right direction gradually reduced toward the protrusion tip end side. As shown in FIG. 5, the front stopper rubber 28 is arranged as a curved surface in which the protrusion tip end surface is curved in a convex shape in the upper-lower direction, and the central portion in the upper-lower direction protrudes forward with respect to the both end portions. The front stopper rubber 28 does not exhibit partial unevenness locally formed on the outer circumference, and particularly is not provided with a buffer protrusion (36) protruding on the protrusion tip end surface or a concave groove (38) open on the outer circumferential surface as provided in the rear stopper rubber 30 to be described afterwards.

The rear stopper rubber 30 as a side stopper rubber is fixed to the outer circumferential surface of the tubular part 18 in the first mounting member 12. The rear stopper rubber 30 is fixed to the front surface of a rear side portion of the tubular part 18, and protrudes rearward from the tubular part 18. Accordingly, the rear stopper rubber 30 protrudes toward a side opposite to the front stopper rubber 28 in the front-rear direction orthogonal to the extending direction (axial direction) of the central axis A of the tubular part 18. The rear stopper rubber 30 is integrally formed with the main rubber elastic body 16.

Figure 3:
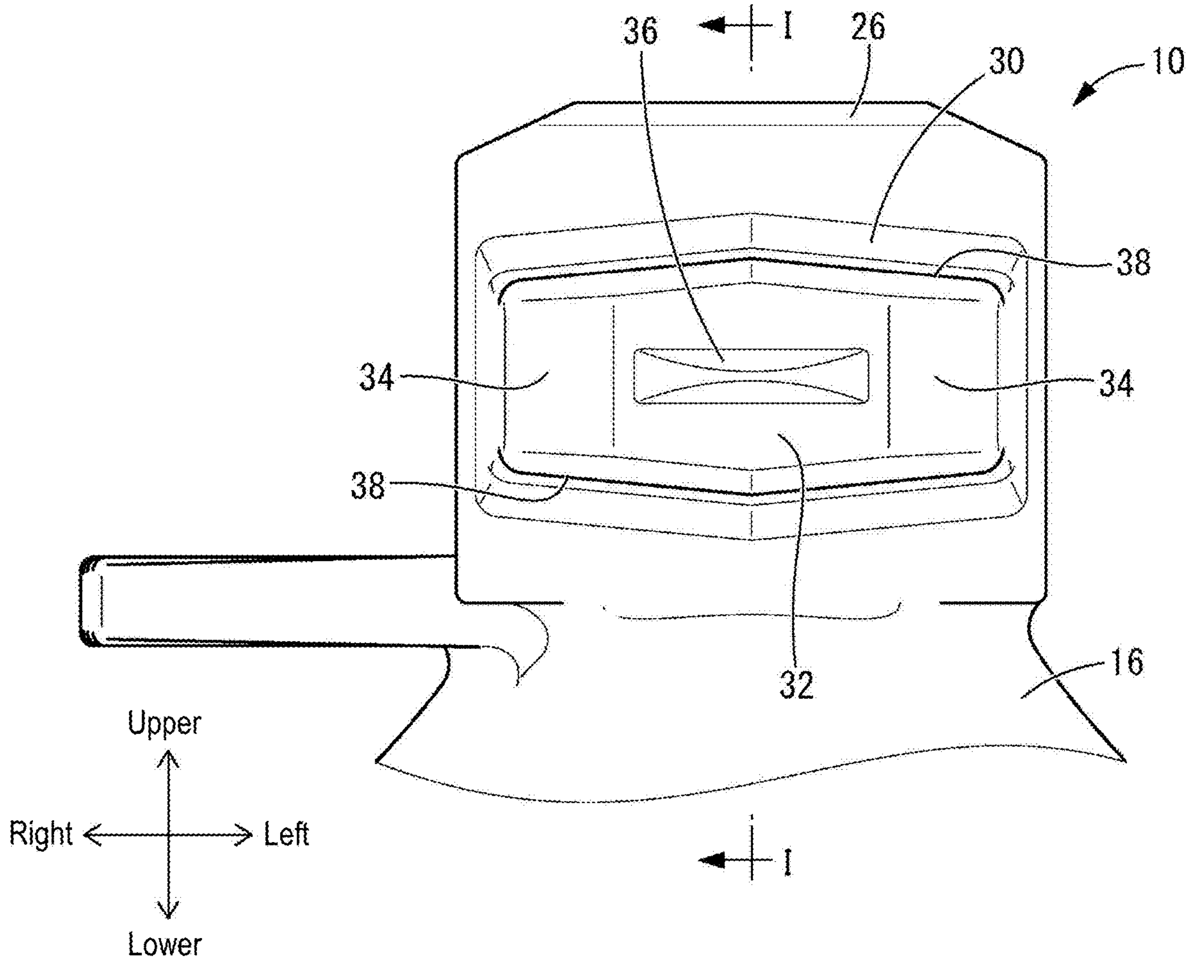
FIG. 3 is a back view of the main components of the engine mount shown in FIG. 2.

The rear stopper rubber 30 is arranged in a flat shape in which the outer dimension in the left-right direction (length dimension) is greater than the outer dimension (width dimension) in the upper-lower direction. In the rear stopper rubber 30, the upper-lower width dimension is gradually reduced from the center in the left-right direction that is the longitudinal direction toward the both outer sides, and the rear stopper rubber 30 is arranged in a substantially hexagonal shape when viewed in a rear view from the rear as shown in FIG. 3. As shown in FIGS. 1 and 5, the rear stopper rubber 30 has a width in the upper-lower direction gradually reduced toward the protrusion tip end side (rear), and, as shown in FIG. 4, also has a width in the left-right direction gradually reduced toward the protrusion tip end side. In addition, the rear stopper rubber 30 is arranged in a tapered shape in which the cross-sectional area is reduced from the protrusion base end toward the protrusion tip end.

As shown in FIG. 4, in the protrusion tip end surface (rear surface) of the rear stopper rubber 30, the left-right central portion is arranged as a central orthogonal surface 32 having a flat shape expanding to be substantially orthogonal to the protrusion direction (front-rear direction), and the both (left, right) outer sides with respect to the central orthogonal surface 32 are arranged as side inclination surfaces 34, 34 inclined forward toward the left-right outward sides.

The buffer protrusion 36 is formed to protrude on the protrusion tip end surface of the rear stopper rubber 30. In a rear view, the buffer protrusion 36 is arranged in a flat shape in which the outer dimension in the left-right direction (length dimension) is greater than the outer dimension in the upper-lower direction (width dimension). In the embodiment, the buffer protrusion 36 is arranged in a substantially laterally elongated rectangular shape. The buffer protrusion 36 is partially provided at the central portion of the protrusion tip end surface of the rear stopper rubber 30 in the upper-lower direction and the left-right direction, and does not reach the upper and lower ends and the left and right ends of the protrusion tip end surface of the rear stopper rubber 30. The buffer protrusion 36 of the embodiment is provided on the central orthogonal surface 32 in the protrusion tip end surface of the rear stopper rubber 30, and does not reach the left and right ends of the central orthogonal surface 32. The buffer protrusion 36 has a protrusion height dimension reduced from the center toward the both outer sides in the upper-lower direction that is a transverse direction, and thus is arranged in a tapered shape with a reduced width toward the protrusion tip end. The buffer protrusion 36 has a protrusion height dimension reduced from the center toward the both outer sides in the left-right direction that is a longitudinal direction, and thus is arranged in a tapered shape with a reduced width toward the protrusion tip end. The rear stopper rubber 30 protrudes rearmost in the central portion where the buffer protrusion 36 is provided.

A protrusion height dimension (front-rear dimension) H1 of the rear stopper rubber 30 is arranged to be greater than a protrusion height dimension H2 of the front stopper rubber 28 (see FIG. 5). A protrusion height dimension H1' of a portion excluding the buffer protrusion 36 in the rear stopper rubber 30 may also be greater than the protrusion height dimension H2 of the front stopper rubber 28. A protrusion height dimension (H1-H1') of the buffer protrusion 36 is smaller than the protrusion height dimension H1' of the portion excluding the buffer protrusion 36 in the rear stopper rubber 30, and may be ¼ of H1'.

Concave grooves 38, 38 are formed at the upper and lower ends of the rear stopper rubber 30, as shown in FIGS. 1 to 5. The concave grooves 38 are open on the upper surface and the lower surface, which are the end surfaces of the rear stopper rubber 30 in the width direction, and extend continuously throughout the entire length in the front-rear direction as the circumferential direction of the rear stopper rubber 30. As shown in FIG. 4, the concave groove 38 extends linearly in the left-right direction, which is the axial direction of the tubular part 18, in a substantially constant groove width dimension. As shown in FIG. 1, the concave grooves 38 have groove cross-sectional shapes toward openings on the upper and lower sides and expanding in the front-rear direction. The cross-sectional shape of the concave groove 38 is substantially constant in the groove length direction.

In the concave groove 38, the groove depth dimension is arranged to be substantially constant in the groove length direction, and is inclined downward or upward toward the outer side from the left-right center along the upper surface or the lower surface of the rear stopper rubber 30. The concave groove 38 has a groove depth dimension less than ¼ of the upper-lower direction dimension of the rear stopper rubber 30, and may also be less than ⅙ of the upper-lower direction dimension of the rear stopper rubber 30. In addition, the depth dimension of the concave groove 38 may be controlled to the extent that the lateral cross-sectional area of the rear stopper rubber 30 in the portion where the concave groove 38 is formed is not smaller than the area of the protrusion tip end surface of the rear stopper rubber 30. Accordingly, excessive concentration of strain and stress at the portion where the concave groove 38 is formed and swing-like distorted deformation of the rear stopper rubber 30 on the protrusion tip side from the concave groove 38 are effectively suppressed.

The concave grooves 38, 38 on the upper and lower sides are formed at the same position in the front-rear direction, and are formed at opposite portions in the width direction (upper-lower direction) in the rear stopper rubber 30. In the embodiment, the concave grooves 38, 38 on the upper and lower sides are arranged as a pair in shapes substantially symmetric to each other. Accordingly, the entirety of the rear stopper rubber 30 including the concave grooves 38, 38 of the embodiment, which includes the buffer protrusion 36, is arranged in a shape symmetric with respect to the upper-lower center.

With the concave grooves 38 extending substantially in parallel with the axial direction (left-right direction) of the tubular part 18, at the left-right central portion of the rear stopper rubber 30 in which the tip end surface is arranged as the central orthogonal surface 32, the protrusion height dimension toward the tip end side with respect to the concave grooves 38 in the rear stopper rubber 30 is substantially constant in the left-right direction. In addition, in the left and right end portions of the rear stopper rubber 30 in which the tip end surfaces are arranged as the side inclination surfaces 34, the protrusion height dimension of the tip end sides with respect to the concave grooves 38 in the rear stopper rubber 30 is reduced toward the outer sides in the left-right direction, and the tip end sides with respect to the concave grooves 38 in the rear stopper rubber 30 are thinned in the front-rear direction toward the outer sides in the left-right direction.

The concave groove 38 is formed in an intermediate portion excluding the base end and the tip end of the rear stopper rubber 30. The center of the concave groove 38 in the front-rear direction is located on the protrusion tip end side (rear) with respect to a center B of the rear stopper rubber 30 in the protrusion direction as indicated by a dot-chain line in FIG. 1. The entirety of the concave groove 38 may be located at the rear of the center B of the rear stopper rubber 30 in the protrusion direction. The concave groove 38 of the embodiment is disposed at a position closer to the center B of the rear stopper rubber 30 in the protrusion direction with respect to the protrusion tip end surface (central orthogonal surface 32) of the rear stopper rubber 30. The concave groove 38 of the embodiment is formed only at one place in the protrusion direction of the rear stopper rubber 30, and the concave groove 38 is not formed at the front of the center B in the protrusion direction of the rear stopper rubber 30 (protrusion base end side). In the rear stopper rubber 30 of the embodiment, the outer circumferential surface at the front of the center B in the protrusion direction is continuous in the circumferential direction and has a smooth shape without partial unevenness.

The engine mount 10 with such configuration is mounted to a vehicle by mounting the first mounting member 12 to a power unit side of an automobile via an inner bracket (not shown) fit into the bracket mounting hole 24 and mounting the second mounting member 14 to a vehicle body side via the outer bracket 40. In addition, the power unit and the vehicle body are linked with each other for vibration damping via the engine mount 10 mounted to the vehicle. In the state in which the engine mount 10 is mounted to the vehicle, the front stopper rubber 28 protrudes toward the front of the vehicle, and the rear stopper rubber 30 protrudes toward the rear of the vehicle.

Figure 6:
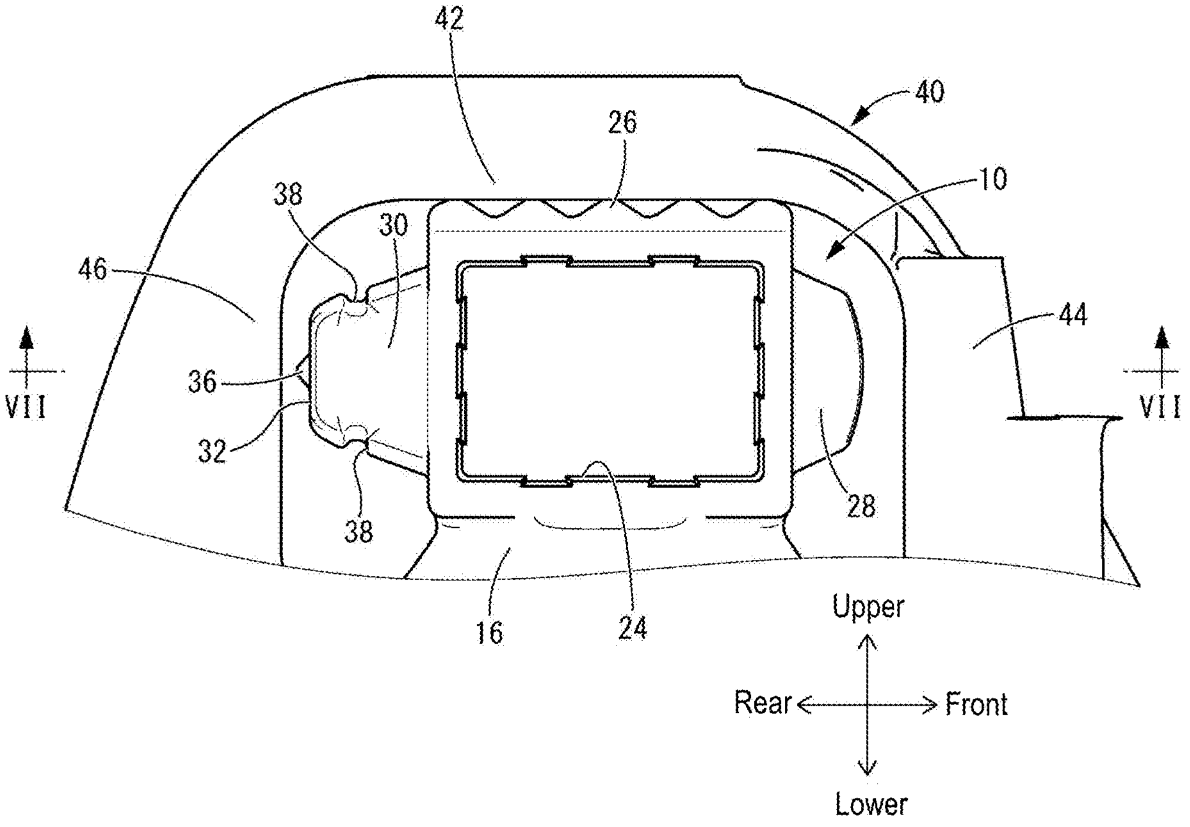
FIG. 6 is a left side view illustrating the main components of the engine mount shown in FIG. 2 in a state in which an outer bracket is mounted.
Figure 7:
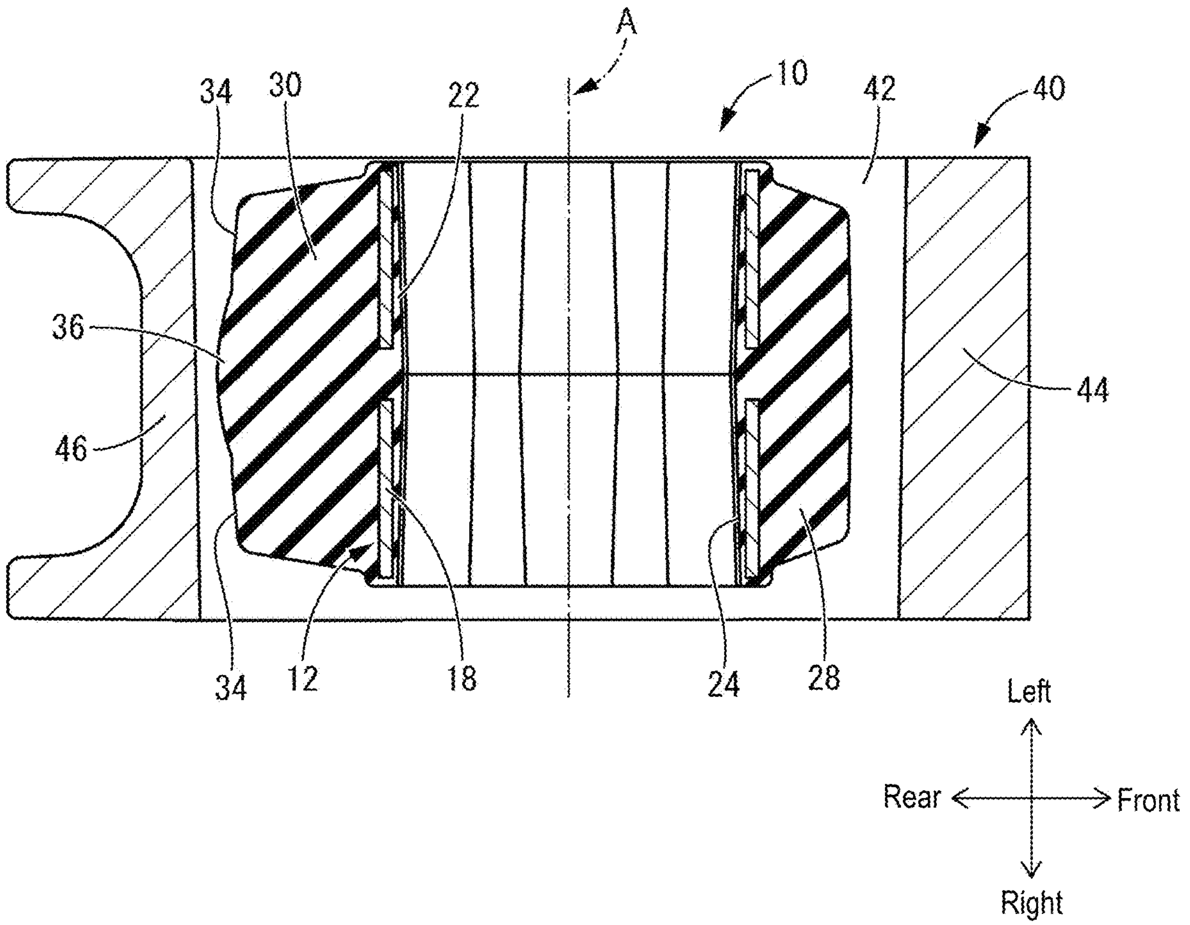
FIG. 7 is a cross-sectional view taken along VII-VII of FIG. 6.

As shown in FIGS. 6 and 7, the outer bracket 40 is disposed to surround the front and rear sides as well as the upper side of the first mounting member 12, and is disposed to face the outer circumference of the tubular part 18. Specifically, a front wall part 44 and a rear wall part 46 of the outer bracket 40 are disposed to be separated from and outward of the front and rear stopper rubbers 28, 30 by a predetermined stopper clearance in the front-rear direction. Although the upper stopper rubber 26 contacts an upper wall part 42 of the outer bracket 40 in FIG. 6, in the vehicle mounted state of the engine mount 1, the first mounting member 12 moves relatively downward with respect to the outer bracket 40 due to a shared support load of the power unit. Therefore, the upper stopper rubber 26 becomes separated downward with respect to the upper wall part 42 of the outer bracket 40.

In the state in which the engine mount 10 is mounted to the vehicle, in the case where the power unit and the vehicle body are relatively displaced, if the relative displacement amount between the first mounting member 12 on the power unit side and the second mounting member 14 mounted on the vehicle body side is too large, issues such as the power unit interfering with other components or the main rubber elastic body 16 being damaged may occur. Therefore, the engine mount 10 includes a stopper mechanism for limiting the relative displacement amount between the first mounting member 12 and the second mounting member 14.

The engine mount 10 includes an upper stopper mechanism limiting an upward relative displacement amount of the first mounting member 12 with respect to the second mounting member 14. The upper stopper mechanism is formed by bringing an upper side portion of the tubular part 18 of the first mounting member 12 and the upper wall part 42 of the outer bracket into contact via the upper stopper rubber 26. Specifically, for example, when the power unit 40 is about to displace significantly upward with respect to the vehicle body, such as when the vehicle rides over a step or a bump, the relative displacement amount between the power unit and the vehicle body is limited by the upper stopper mechanism, and an excessive tensile force in the upper-lower direction with respect to the main rubber elastic body 16 is prevented.

The engine mount 10 includes a front stopper mechanism limiting a forward relative displacement amount of the first mounting member 12 with respect to the second mounting member 14. The forward stopper mechanism is formed by bringing the sidewall part on the front side of the tubular part 18 of the first mounting member 12 into contact with the front wall part 44 of the outer bracket 40, which is a component on the side of the second mounting member 14, via the front stopper rubber 28. Specifically, for example, when the power unit is about to displace significantly forward with respect to the vehicle body due to rapid deceleration of the automobile, etc., the relative displacement amount between the power unit and the vehicle body is limited by the front stopper mechanism. Accordingly, for example, the steering stability is improved by limiting the displacement of the power unit of a large mass, and the durability is improved by preventing excessive deformation of the main rubber clastic body 16.

The front stopper rubber 28 does not include a buffer protrusion or a concave groove like the rear stopper rubber 30. In addition, the protrusion height dimension of the front stopper rubber 28 is less than the protrusion height dimension of the rear stopper rubber 30, and the maximum cross-sectional area (lateral cross-sectional area at the base end) in the front-rear orthogonal cross-section of the front stopper rubber 28 is set to be substantially the same as the maximum cross-sectional area (lateral cross-sectional area at the base end) of the front-rear orthogonal cross-section of the rear stopper rubber 30. Accordingly, the compression spring of the front stopper rubber 28 in the protrusion direction is set to be harder than the compression spring of the rear stopper rubber 30 in the protrusion direction. The front stopper mechanism exhibits excellent displacement limiting performance with respect to the displacement of the power unit during rapid deceleration.

In addition, the engine mount 10 includes a rear stopper mechanism limiting a rearward relative displacement amount of the first mounting member 12 with respect to the second mounting member 14. The rear stopper mechanism is formed by bringing a rear sidewall part of the tubular part 18 of the first mounting member 12 and the rear wall part 46 of the outer bracket 40 into contact via the rear stopper rubber 30. Specifically, for example, when the power unit is about to displace significantly rearward with respect to the vehicle body due to rapid acceleration of the automobile, etc., the relative displacement amount between the power unit and the vehicle body is limited by the rear stopper mechanism. Accordingly, for example, the steering stability is improved by limiting the displacement of the power unit of a large mass, and the durability is improved by preventing excessive deformation of the main rubber elastic body 16.

In addition to the case of rapid acceleration, for example, the rear stopper rubber 30 forming the rear stopper mechanism also contacts the rear wall part 46 of the outer bracket 40 at the time of slow acceleration. Therefore, at the time of slow acceleration as well, the rearward relative displacement of the power unit with respect to the vehicle body is limited by the rear stopper mechanism.

In the state in which the rear stopper rubber 30 contacts the outer bracket 40 due to slow acceleration, the load of another direction, such as left-right direction, may also be input due to a steering wheel operation, etc. Therefore, from the viewpoint of ride comfort, it is important to prevent the spring from becoming excessively hard due to the contact of the rear stopper rubber 30. In addition, due to slow acceleration, the rear stopper rubber 30 contacting the outer bracket 40 has a small compression displacement amount, and has the tip end portion with a small cross-sectional area that is compressed and deformed, but has a base end portion with a large cross-sectional area that is hardly compressed and deformed. Therefore, a soft spring property of the protrusion tip end portion is required. Here, the rear stopper rubber 30 is arranged in a tapered shape whose width is reduced in the upper-lower direction and left-right direction toward the protrusion tip end side. Therefore, the cross-sectional area of the front-rear orthogonal cross-section of the protrusion tip end portion is reduced, and the protrusion tip end portion is preferentially deformed over the base end portion. Therefore, a soft spring property is realized in a state in which the compression deformation amount is small.

The rear stopper rubber 30 includes the buffer protrusion 36 on the protrusion tip end surface. The buffer protrusion 36 has a front-rear orthogonal cross-section smaller than the protrusion tip end surface of the rear stopper rubber 30 and includes a soft compression spring property, and protrudes further rearward from the protrusion tip end surface of the rear stopper rubber 30. Therefore, the buffer protrusion 36 can preferentially contact the outer bracket 40 and attain a soft spring property. Moreover, the buffer protrusion 36 is tapered toward the protrusion tip end side, and the compression spring gradually becomes harder as the compression deformation amount in the front-rear direction increases. Therefore, the increase of the spring property at the initial stage of contact is suppressed, a shock feeling due to a rapid increase in compression spring with respect to the increase in compression deformation amount is suppressed, and favorable ride comfort performance, etc., is realized. In particular, the buffer protrusion 36 of the embodiment, when viewed in a rear view, has a left-right dimension greater than the upper-lower dimension. Therefore, the buffer protrusion 36 is formed on the protrusion tip end surface of the rear stopper rubber 30 in which the left-right dimension is greater than the upper-lower dimension in a rear view with favorable space efficiency, and, by securing the large dimension in the left-right direction, it is easy to attain a property that the compression spring becomes harder as the compression deformation of the buffer protrusion 36 progresses.

In the rear stopper rubber 30, the width dimension in the upper-lower direction is gradually reduced from the left-right center toward the both (left, right) outer sides. Since the contact region of the rear stopper rubber 30 with respect to the outer bracket 40 expands from the central portion where the buffer protrusion 36 is provided toward the both (left, right) outer sides, if the upper-lower width of the rear stopper rubber 30 is reduced toward the both (left, right) sides, the increase rate of the contact area that accompanies the expansion of the contact region of the rear stopper rubber 30 toward the both (left, right) outer sides can be suppressed. Therefore, the change of compression spring that accompanies the increase of the compression deformation amount of the rear stopper rubber 30 is slower, and the adverse effect to the ride comfort due to a sudden change of compression spring can be prevented.

The upper and lower concave grooves 38, 38 are formed in the rear stopper rubber 30. In addition, the cross-sectional area of the front-rear orthogonal cross-section of the rear stopper rubber 30 is reduced at the portions where the concave grooves 38, 38 are formed. Accordingly, at the time when the rear stopper rubber 30 is compressed in the front-rear direction, the compression spring of the rear stopper rubber 30 is reduced, and, in particular, a soft spring property in the state in which the compression deformation amount of the rear stopper rubber 30 is small is realized.

The concave grooves 38, 38 are provided on the tip end side with respect to the center B of the rear stopper rubber 30 in the protrusion direction. Therefore, the deformation amount of the portions where the concave grooves 38, 38 are formed is secured even in the state in which the compression deformation amount of the rear stopper rubber 30 is small, and a soft spring property is quickly exerted due to the formation of the concave grooves 38, 38. Moreover, by forming the concave grooves 38, 38 at the tip end portion of the rear stopper rubber 30 that is tapered, without excessively deepening the concave grooves 38, 38, the front-rear orthogonal cross-sectional area of the rear stopper rubber 30 at the portions where the concave grooves 38, 38 are formed can be made sufficiently small. The concave grooves 38, 38 are not formed on the base end side with respect to the center B of the rear stopper rubber 30 in the protrusion direction. Therefore, at the time when a large load that increases the compression deformation amount of the rear stopper rubber 30 is input, due to the hard compression spring property of the base end portion of the rear stopper rubber 30, excellent displacement limiting performance is exerted.

The upper and lower concave grooves 38, 38 are formed at substantially the same position in the protrusion direction of the rear stopper rubber 30, and are open at opposing portions of the rear stopper rubber 30 in the upper-lower direction. Therefore, without excessively increasing the depths of the upper and lower concave grooves 38, 38, the area of the front-rear orthogonal cross-section of the rear stopper rubber 30 at the portions where the concave grooves 38, 38 are formed is reduced, and the soft compression spring property of the rear stopper rubber 30 is realized. In the embodiment, the shapes and the sizes of the upper and lower concave grooves 38, 38 are arranged to be substantially the same. Therefore, at the time when a compression force in the protrusion direction acts on the rear stopper rubber 30, the distorted deformation of the rear stopper rubber 30 and the swing-like tilting deformation of the protrusion tip end side with respect to the concave grooves 38, 38 due to the formation of the concave grooves 38, 38 hardly occurs.

The front-rear separation distance (stopper clearance) between the rear stopper rubber 30 including the buffer protrusion 36 and the rear wall part 46 of the outer bracket 40 is smaller than the front-rear separation distance between the front stopper rubber 28 and the front wall part 44 of the outer bracket 40. Accordingly, when a relatively small load is input, the rear stopper rubber 30 contacts the outer bracket 40 and exerts a soft spring property, gradually becomes harder when the input load increases, and gradually exerts a strong stopper effect that limits the displacement of the power unit. In brief, the rear stopper rubber 30 is set to have a compression deformation stroke greater than the front stopper rubber 28, and gradually transitions from a soft spring property to a hard spring property. Therefore, the engine mount 10 realizes favorable ride comfort during normal acceleration, and, at the time of sudden acceleration, the engine mount 10 secures steering stability and durability by limiting the displacement amount of the power unit.

Although the embodiments of the disclosure have been described in detail above, the disclosure is not limited by the specific descriptions. For example, in the case where multiple concave grooves are formed in the side stopper rubber, the concave grooves may also be disposed at positions different from each other in the protrusion direction of the side stopper rubber.

The concave groove may extend continuously throughout the entire circumference in the circumferential direction of the side stopper rubber, and may also be disposed only in a portion in the circumferential direction. As can also be understood, the concave grooves are not limited to being open on the upper surface and the lower surface of the side stopper rubber as shown in the embodiment, and may also be formed to be open on the left surface or the right surface. Specifically, for example, any of a concave groove open on one or both of the left surface and the right surface of the side stopper rubber, a concave groove extending, in a hook shape, continuously on the upper surface and the left surface of the side stopper rubber, and a concave groove extending, in a U shape, on the upper surface, the left surface, and the lower surface of the side stopper rubber, etc., may be adopted.

At least one of the width dimension, the depth dimension, and the cross-sectional shape of the concave groove may vary in the groove length direction. The width dimension, the depth dimension, and the cross-sectional shape of the concave groove shown in the embodiment merely serve as examples and shall not be construed as limiting. The concave groove may have at least a portion extending to be inclined with respect to the circumferential direction of the side stopper rubber. The concave groove may as a whole extend in the circumferential direction of the side stopper rubber, or may include a portion partially extending in the protrusion direction of the side stopper rubber.

The side stopper rubber is not limited to having a substantially hexagonal shape when viewed in the protrusion direction as shown in the embodiment, and may also have other polygonal shapes such as a rectangular shape, and may also have a circular shape including an elliptical shape, and an irregular shape.

The side stopper rubber may be arranged in a tapered shape in which the area of the protrusion tip end surface is smaller than the lateral cross-sectional area of the protrusion base end part, or an inclined surface gradually tapered toward the protrusion tip end side on the outer circumferential surface may also be partial in the protrusion direction. Here, the position where the concave groove is formed in the side stopper rubber is located at a position where the lateral cross-sectional area of the side stopper rubber at the portion where the concave groove is formed is smaller than the lateral cross-sectional area of the protrusion base end part of the side stopper rubber and greater than the area of the protrusion tip end surface.

The cross-sectional shape orthogonal to the protrusion direction of the buffer protrusion is not limited to be flat, but may also have a square shape or a circular shape, for example. Multiple buffer protrusions may also be provided on the tip end surface of the side stopper rubber.

In the embodiment, an example in which only the rear stopper rubber located on the rear side of the vehicle is arranged as the side stopper rubber according to the disclosure. However, the front stopper rubber located on the front side of the vehicle may also be configured as the side stopper rubber according to the disclosure. In brief, the arrangement (protrusion direction) of the side stopper rubber according to the disclosure is not particularly limited. Accordingly, for example, the side stopper rubber may also be arranged to protrude in the left-right direction of the vehicle.

The vibration damping device may also be a fluid-filled vibration damping device in which a liquid chamber is provided inside and which exerts a vibration damping effect based on a flowing behavior of a fluid.

What is claimed is:

1. A vibration damping device, having a configuration in which a first mounting member and a second mounting member are elastically linked by a main rubber elastic body, wherein the first mounting member has a tubular part open and extending on a side;

a side stopper rubber is provided, the side stopper rubber protruding from an outer circumferential surface of the tubular part toward an outer circumference toward a side orthogonal to an axial direction of the tubular part, the side stopper rubber is arranged in a tapered shape toward a protrusion tip end, the side stopper rubber has, in a protrusion direction, a base end, a tip end, and an intermediate portion between the base end and the tip end, in the entire side stopper rubber, only the intermediate portion is provided with a concave groove extending in a circumferential direction of the side stopper rubber, and the side stopper rubber has a buffer protrusion protruding from a protrusion tip end surface of the side stopper rubber, wherein when viewed in a width direction of the side stopper rubber orthogonal to the axial direction of the tubular part, the buffer protrusion is arranged in a tapered shape in which a protrusion height dimension in the protrusion direction is reduced relative to the protrusion tip end surface gradually from a center in a length direction of the side stopper rubber orthogonal to the width direction toward both outer sides in the length direction.

2. The vibration damping device as claimed in claim 1, wherein the concave groove is formed on a tip end side with respect to a center of the side stopper rubber in the protrusion direction, but not formed on a base end side with respect to the center of the side stopper rubber in the protrusion direction, when viewed in the protrusion direction, the side stopper rubber is arranged in a shape in which a length dimension in the axial direction of the tubular part is greater than a width dimension in the width direction, the buffer protrusion is partially provided at a center of the protrusion tip end surface of the side stopper rubber, and when viewed in the protrusion direction, the buffer protrusion is arranged in a shape in which a length dimension in the axial direction of the tubular part is greater than a width dimension in the width direction.

3. The vibration damping device as claimed in claim 2, wherein a pair of concave grooves are formed on both side surfaces of the side stopper rubber in the width direction.

4. The vibration damping device as claimed in claim 2, wherein a pair of concave grooves extend linearly to be substantially parallel to the axial direction of the tubular part on both side surfaces of the side stopper rubber in the width direction, and a protrusion height dimension of the side stopper rubber on the tip end side with respect to the concave grooves in the side stopper rubber is reduced toward both outer sides at both end portions of the side stopper rubber in the axial direction of the tubular part.

5. The vibration damping device as claimed in claim 2, wherein when viewed in the axial direction of the tubular part, the buffer protrusion is arranged in a tapered shape in which a protrusion height dimension is reduced from a center in the width direction toward both outer sides.

6. The vibration damping device as claimed in claim 2, wherein a width of the side stopper rubber is reduced from the center in the length direction toward the both outer sides.

7. The vibration damping device as claimed in claim 1, wherein in a vehicle mounted state in which the first mounting member and the second mounting member are mounted to a vehicle, a front stopper rubber protruding toward a front of the vehicle and a rear stopper rubber protruding toward a rear of the vehicle are provided, the rear stopper rubber is arranged as the side stopper rubber, and the front stopper rubber has a protrusion height dimension smaller than the rear stopper rubber, and is formed with neither the concave groove of the outer circumferential surface nor the buffer protrusion of the protrusion tip end surface.

* * * * *